(12) United States Patent
Tabatabai et al.

(10) Patent No.: US 9,774,879 B2
(45) Date of Patent: Sep. 26, 2017

(54) INTRA-BLOCK COPYING ENHANCEMENTS FOR HEVC IN-RANGE-EXTENSION (REXT)

(71) Applicant: SONY CORPORATION, Tokyo (JP)

(72) Inventors: Ali Tabatabai, Cupertino, CA (US); Jun Xu, Sunnyvale, CA (US); Ohji Nakagami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 505 days.

(21) Appl. No.: 14/330,571

(22) Filed: Jul. 14, 2014

(65) Prior Publication Data

US 2015/0049813 A1 Feb. 19, 2015

Related U.S. Application Data

(60) Provisional application No. 61/866,606, filed on Aug. 16, 2013, provisional application No. 61/889,925, (Continued)

(51) Int. Cl.
| | |
|---|---|
| *H04N 19/51* | (2014.01) |
| *H04N 19/583* | (2014.01) |
| *H04N 19/513* | (2014.01) |
| *H04N 19/52* | (2014.01) |
| *H04N 19/70* | (2014.01) |

(52) U.S. Cl.
CPC .......... *H04N 19/513* (2014.11); *H04N 19/52* (2014.11); *H04N 19/70* (2014.11)

(58) Field of Classification Search
CPC ....... H04N 19/513; H04N 19/52; H04N 19/70
See application file for complete search history.

(56) References Cited

U.S. PATENT DOCUMENTS

2010/0027615 A1* 2/2010 Pandit ................. H04N 19/597
   375/240.01
2010/0150242 A1 6/2010 Ozawa et al.
(Continued)

FOREIGN PATENT DOCUMENTS

CN 103229503 A 7/2013
EP 2637409 A1 9/2013
(Continued)

OTHER PUBLICATIONS

Hang et al. "Towards the Next Video Standard: High Efficiency Video Coding," Proceedings of the Second APSIPA Annual Summit and Conference, pp. 609-618, Biopolis, Singapore, Dec. 14-17, 2010.

(Continued)

*Primary Examiner* — Andy Rao
*Assistant Examiner* — Tyler Edwards
(74) *Attorney, Agent, or Firm* — Chip Law Group

(57) ABSTRACT

High efficiency video coding (HEVC) enhancements are described for intra-block copying for reducing motion vector (MV) coding redundancy and enhancing in range extensions (RExt) by selecting a default block my predictor. In reducing MV data redundancy, the value of MVx and/or MVy can have a baseline at the width (W), or height (H) of the respective block, whereby fewer bits need to be encoded. One embodiment for enhancing RExt provides an improved selection of a default block vector predictor for the first CU performing intra-block copying in a CTU.

15 Claims, 6 Drawing Sheets

Related U.S. Application Data filed on Oct. 11, 2013, provisional application No. 61/892,258, filed on Oct. 17, 2013, provisional application No. 61/919,948, filed on Dec. 23, 2013.

(56) References Cited

U.S. PATENT DOCUMENTS

| | | |
|---|---|---|
| 2011/0176615 A1* | 7/2011 | Lee .................... H04N 19/52 375/240.16 |
| 2012/0051431 A1 | 3/2012 | Chien et al. |
| 2012/0189055 A1 | 7/2012 | Chien et al. |
| 2013/0177084 A1 | 7/2013 | Wang et al. |
| 2013/0279583 A1 | 10/2013 | Gao et al. |
| 2014/0003489 A1 | 1/2014 | Hannuksela |
| 2014/0003493 A1 | 1/2014 | Chen et al. |

FOREIGN PATENT DOCUMENTS

| | | | |
|---|---|---|---|
| WO | WO 2010039822 A2 * | 4/2010 | ........... H04N 19/122 |
| WO | 2010039822 A2 | 5/2010 | |

OTHER PUBLICATIONS

ISA/USPTO, International Search Report and Written Opinion issued Jan. 2, 2015 for corresponding international Patent Application No. PCT/US14/50766 (pp. 1-12) and PCT claims (pp. 13-17) pp. 1-17.

* cited by examiner

INTRA-BLOCK COPYING ENHANCEMENTS FOR HEVC IN-RANGE-EXTENSION (REXT)

CROSS-REFERENCE TO RELATED APPLICATIONS

This application claims priority to, and the benefit of, U.S. provisional patent application Ser. No. 61/866,606 filed on Aug. 16, 2013, incorporated herein by reference in its entirety. This application claims priority to, and the benefit of, U.S. provisional patent application Ser. No. 61/889,925 filed on Oct. 11, 2013, incorporated herein by reference in its entirety. This application claims priority to, and the benefit of, U.S. provisional patent application Ser. No. 61/892,258 filed on Oct. 17, 2013, incorporated herein by reference in its entirety. This application claims priority to, and the benefit of, U.S. provisional patent application Ser. No. 61/919,948 filed on Dec. 23, 2013, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE TECHNOLOGY

1. Technological Field

The present disclosure pertains generally to High Efficiency Video Coding (HEVC) intra-block coding, and more particularly to intra-block copying enhancements for in range-extension (RExt) in HEVC.

2. Description of Related Technology

High Efficiency Video Coding (HEVC) is a video compression standard which has succeeded H.264/MPEG-4 AVC and was jointly developed by ISO/IEC Moving Picture Experts Group (MPEG) and ITU-T Video Coding Experts Group (VCEG) in a Joint Collaborative Team on Video Coding (JCT-VC) to develop the HEVC standard. HEVC provides a number of enhancements in relation to previous standards, whereby data compression ratios can be doubled in relation to previous standards for a given level of video quality.

It should be appreciated that in HEVC coding, a coding tree unit (CTU) is up to 64×64 pixels, and is also referred to as largest coding unit (LCU). A CTU is the basic processing unit generally corresponding to a macroblock referred to in previous video standards. CTUs of a picture are divided for luma and chroma components into coding tree blocks (CTBs), which are divided into one or more coding units (CUs) arranged as a quadtree within each CTB. CUs are divided into prediction units (PUs) of either intra-picture or inter-picture prediction type. In coding a prediction residual, a CU is divided into a quadtree of transform units (TUs). TU data fields include skip_mb_flag, merge_flag, motion vector difference (mvd), cbf_luma, and so forth.

In HEVC according to JCTVC-N1005_v3, there are a number of elements regarding BVIntra, MV coding of IntraBC, and interaction of IntraBC, which are non-optimal.

High-efficiency video coding (HEVC) has utilized in-range extension (RExt) intra-block motion compensation or copying as an additional intra-coding mode. A flag on the coding-unit (CU) level signals this intra-block coping mode.

When a CU is subject to intra-block copying, the motion vector referring to the reconstructed areas in the same picture is signaled. The predicted sample values of the current CU will be the reconstructed sample values identified by the motion vector. The motion vector for intra-block coding are binarized using Ex-Golomb code and coded in context-adaptive binary arithmetic coding (CABAC) (e.g., an entropy coding mechanism) similar to MV difference coding in HEVC. However, the current use of RExt includes some redundancy.

Redundancy arises in relation to other aspects of intra-block coding, including a redundancy in By valid names.

Accordingly, a need exists for enhanced intra-block operations for RExt in HEVC. The presented technology fulfills that need and overcomes shortcomings of previous techniques.

BRIEF SUMMARY

Enhancements are described for intra-block coding during high efficiency video coding (HEVC). Embodiments of the disclosed technology address issues of reducing MV coding redundancy, intra-block copying in RExt, motion vector coding in intra-block copying for RExt, and the default block vector.

Further aspects of the technology will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology will be more fully understood by reference to the following drawings which are for illustrative purposes only:

DETAILED DESCRIPTION 1.0 Modifying MV Coding.

This implementation reduces the redundancy in MV coding. In RExt 4.1, the motion vector of intra-block copying mode is coded using the MVD coding scheme directly. Because of the causality of intra-block copying, the motion vector values cannot be arbitrary located in the search range. For example, a CU cannot copy a reference block which overlaps with itself, or that includes any non-reconstructed pixels.

In the current HEVC RExt, motion vectors in intra-block copying are treated the same way as in motion vector difference 'mvd' in (PU) and (TU) data in regard to entropy coding. There is some redundancy, since a motion vector (MV) in intra-block copying does not occupy the entire code space.

Figure 1:
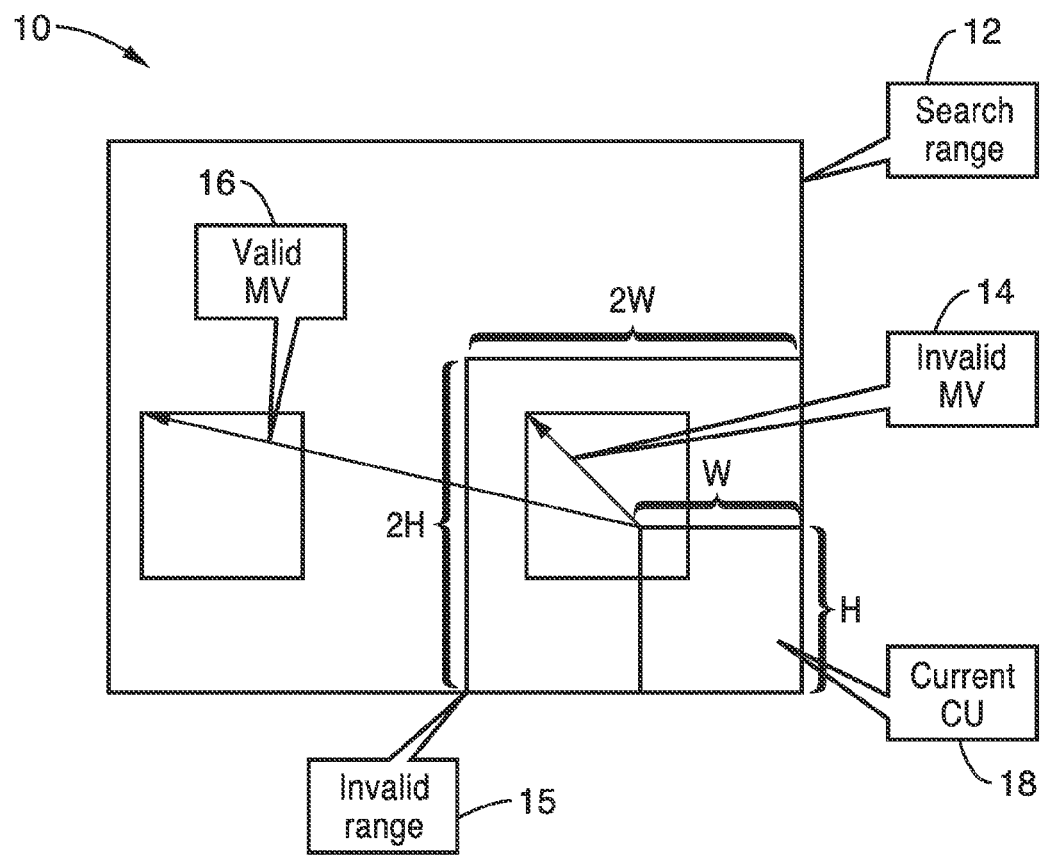
FIG. 1 is a diagram of a CU in relation to valid and invalid MV search ranges for HEVC according to an embodiment of the technology presented.

FIG. 1 illustrates an embodiment 10 showing an invalid MV 14 and invalid range 15, along with an example valid 16 MV, within a search range 12 for the current CU 18. The area of twice the height (2H) and twice the width (2W) of the CU is seen as an invalid 15, with a valid range 16 outside of it in a larger search range 12. As demonstrated in the figure, the absolute values of horizontal (MVx) and vertical (MVy) motion vector components in intra-block copying mode cannot be both less than the size of the current CU. In the other words, if MVx is less than CU width (W), |MVy| has to be larger than the height (H) of current CU. |MVy| can be reduced to save bits in coding the value. Those invalid motion vectors lead to redundancy in MV coding of intra-block copying mode. This portion of the inventive teachings can eliminate that redundancy.

Embodiments of the presented technology consider the causality constraint, to improve MV coding by reducing MV absolute values to save bits. A high-level syntax can be utilized with the present technology to signal the solution selection in the sequence parameter set (SPS) or picture parameter set (PPS) or in the slice header.

In a first implementation, before MV (i.e., MVx, MVy) is encoded at the encoder, the following applies:

Encoder: If abs($MVx$)<$W$, then $MVy=MVy+H$.

At the decoder side, after parsing MV from the bitstream, the following applies:

Decoder: If abs($MVx$)<$W$, then $MVy=MVy-H$.

By way of example, the coding of MVx and MVy can then be performed by coding only the MVx and MVy value, which exceeds block width (W) or height (H), respectively, thus reducing MV data redundancy and requiring encoding of fewer bits.

Figure 2:
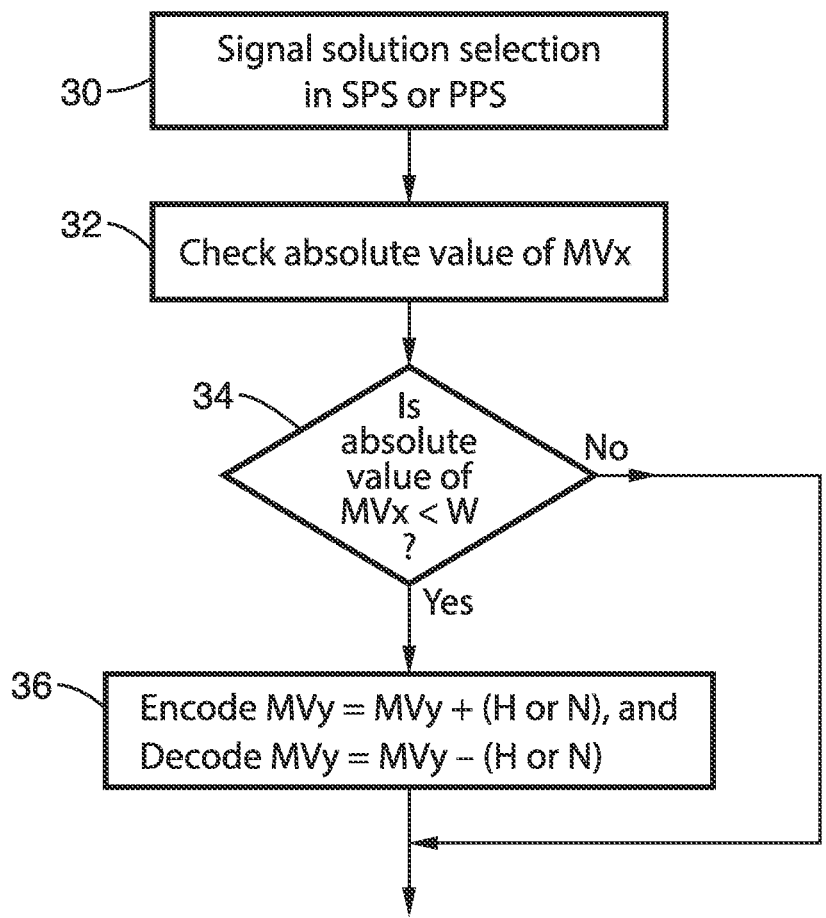
FIG. 2 is a flow diagram of a first implementation of motion vector (MV) handling for intra-block copying which eliminates invalid ranges according to an embodiment of the technology presented.

FIG. 2 illustrates the above implementation with signaling 30, checking of absolute value of MVx 32, threshold check 34 and if MVx<W, then performing the offset 36. It will be seen that the offset may comprise W as outlined above, or a predetermined offset N, as discussed in a later section.

The following describes changes necessary to the 8.4.4.2.7 HEVC specification for intra-block copying prediction mode for implementing the above, prior to a discussion of alternative forms of shifting.

Inputs to this intra-block copying prediction mode include the following: (a) A sample location (xTbCmp, yTbCmp) input is included which specifies the top-left sample of the current transform block relative to the top left sample of the current picture; (b) A variable nTbS is included which specifies the transform block size; (c) A variable bvIntra specifying the block copying vector is provided for intra-block copying; (d) A variable cIdx is provided for the copy operation which specifies the color component of the current block.

The output of this copy prediction mode are the predicted samples predSamples[x][y], with x, y=0, . . . nTbS−1. The variable by represents the block vector for prediction in full-sample units is derived as follows:

$$bv[0]=(abs(bvIntra[1])<nTbs?bvIntra[0]-nTbs:bvIntra[0])>>(((cIdx==0)?1:SubWidthC)-1). \quad (8-63)$$

$$bv[1]=bvIntra[1]>>(((cIdx==0)?1:SubHeightC)-1) \quad (8-64)$$

The first line of Eq. 8-63 (bv[0]=(abs(bvIntra[1])<nTbs ? bvIntra[0]−nTbs:bvIntra[0])) has been changed according to the disclosed technology. The (nTbS)×(nTbS) array of predicted samples, with x, y=0, . . . nTbS−1, are derived as follows. (a) The reference sample location (xRefCmp, yRefCmp) is specified according to, $$xRefCmp,yRefCmp)=(xTbCmp+x+bv[0],yTbCmp+y+bv[1]. \quad (8-65)$$

(b) Each sample at the location (xRefCmp, yRefCmp) is assigned to predSamples[x][y]. The above changes may be similarly described for any of the following variations, in which different forms of offsets are utilized.

In at least one embodiment, the offsets may comprise a predetermined offset, with the implementation given as follows:

Encoder: If abs($MVx$)<$W$, then $MVy=MVy+N$

Decoder: If abs($MVx$)<$W$, then $MVy=MVy-N$ wherein the fixed offset N can take on desired values, for example 4, 8, 16 and 32, or other integer values. Use of binary digit values (4, 8, 16, 32, and so forth) has the added benefit of being implemented using a simple shift operation of 2-4 places for offsets from 4-32, or larger shifts for higher offsets.

In a second implementation, before MV (i.e., MVx, MVy) is encoded at the encoder, the following applies:

Encoder: If abs($MVy$)<$H$, then $MVx=MVx+W$

Decoder: If abs($MVy$)<$H$, then $MVx=MVx-W$

At the decoder side, the restoration of MVy is performed after MV is parsed from the bitstream. A similar variation exists, in which a predetermined offset is utilized as given by:

Encoder: If abs($MVy$)<$H$, then $MVx=MVx+N$

Decoder: If abs($MVy$)<$H$, then $MVx=MVx-N$

Wherein, the fixed offset N, for example, may comprise values such as 4, 8, 16 and 32, or other integer values, and more preferably binary values allowing the offset to be performed in response to shifting.

Figure 3:
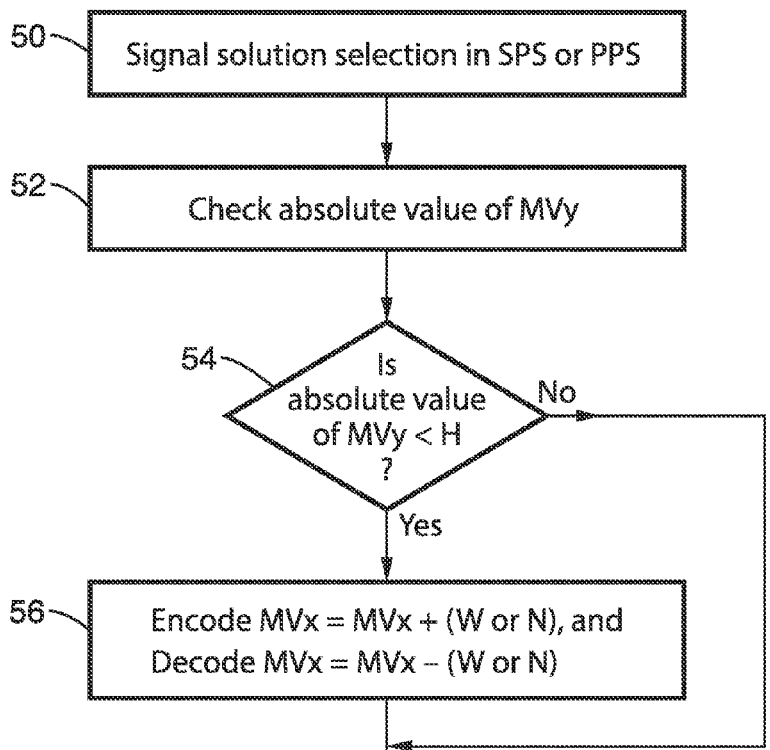
FIG. 3 is a flow diagram of a second implementation of motion vector (MV) handling for intra-block copying which eliminates invalid ranges according to an embodiment of the technology presented.

FIG. 3 illustrates the above implementations with signaling 50, checking of absolute value of MVy 52, threshold check 54 and if MVy<H, then performing the offset 56. It will be seen that the offset may comprise H, or a predetermined offset N.

In a third alternative, one or more of the motion vectors is shifted unconditionally, such as given by the following:

Encoder: $MVy=MVy+H, MVx=MVx+W,$

Decoder: $MVy=MVy-H, MVx=MVx-W,$

As an alternative to the above, the shifting may be performed on only one of the motion vectors, such as either of the following:

Encoder: $MVy=MVy+H,$

Decoder: $MVy=MVy-H;$

OR

Encoder: $MVx=MVx-W,$

Decoder: $MVx=MVx+W.$

Or alternatively, by performing an unconditional shift by a predetermined amount such as the following:

Encoder: $MVy=MVy+N, MVx=MVx+N,$

Decoder: $MVy=MVy-N, MVx=MVx-N,$

OR

Encoder: $MVy=MVy+N,$

Decoder: $MVy=MVy-N,$

OR

Encoder: $MVx=MVx+N,$

Decoder: $MVx=MVx-N.$

In which the predetermined offset preferably takes values such as 4, 8, 16, 32 or other integer values.

Figure 4:
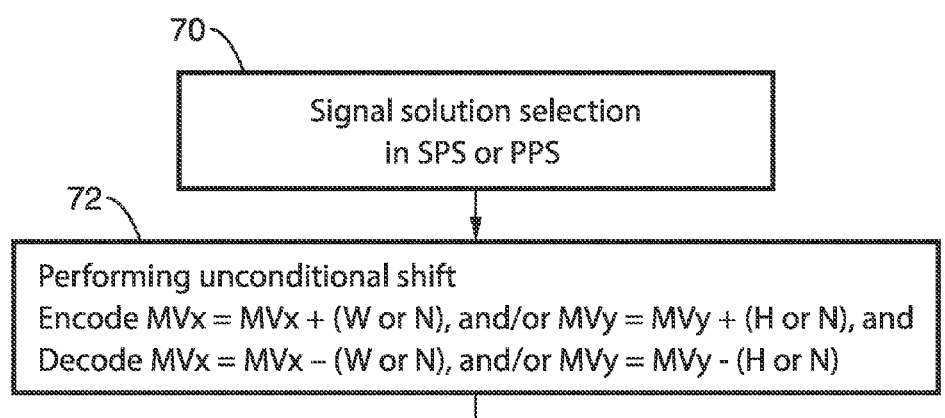
FIG. 4 is a flow diagram of a third implementation of motion vector (MV) handling for intra-block copying which eliminates invalid ranges according to an embodiment of the technology presented.

FIG. 4 illustrates the above implementations with signaling 70, followed by performing unconditional offsets 72, involving either or both MVx and MVy, being shifted by W or N (for MVx), and H or N (for MVy), respectively.

2.0 Changing Interaction of IntraBC.

Another implementation of an MVD coding scheme assumes a symmetric distribution of syntax elements, while motion vectors of intra-block copying mode demonstrate a shifted peak at MVx to the negative region based on RExt4.1. By way of example and not limitation, MVx can simply be shifted without conditions (unconditionally).

Figure 5A:
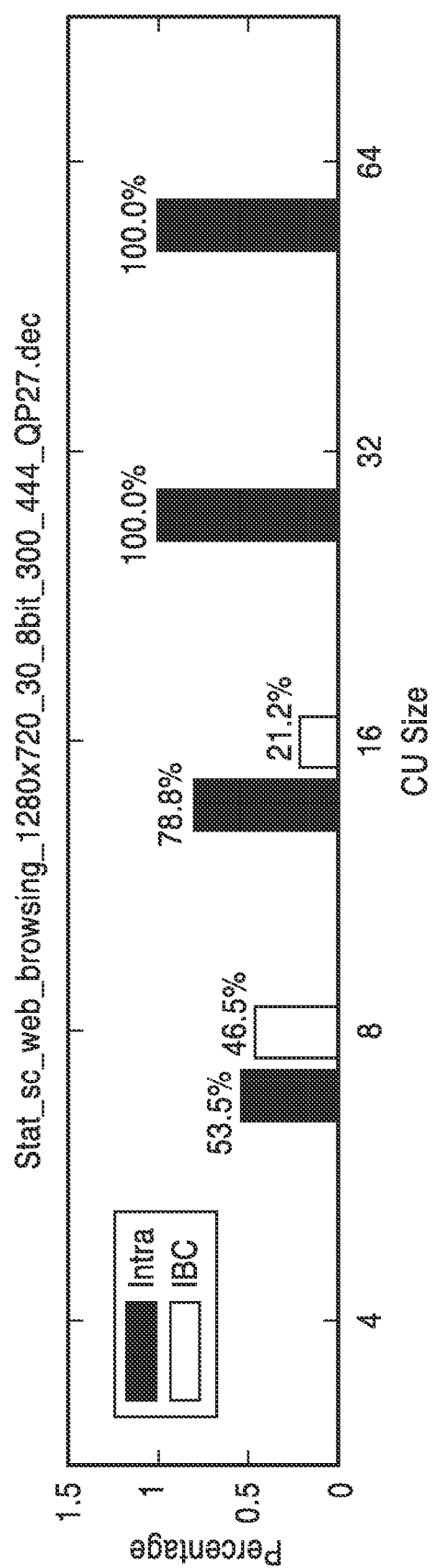
FIG. 5A through FIG. 5C are bar graphs of symmetric distribution in an MVD coding scheme, and shifted peak counts at MVx and not at MVy to the negative region based on RExt4.1.
Figure 5B:
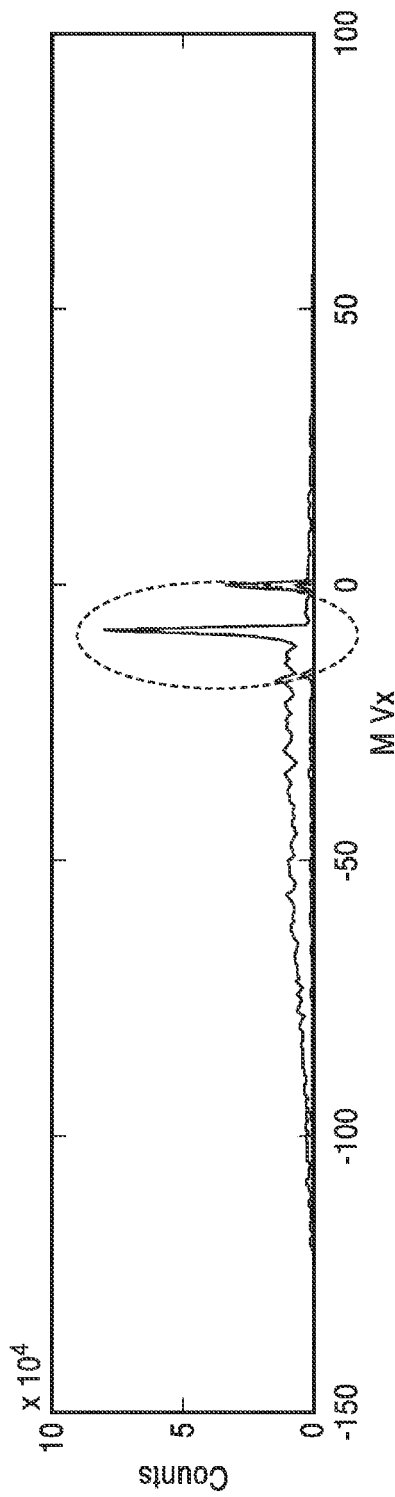
Figure 5C:
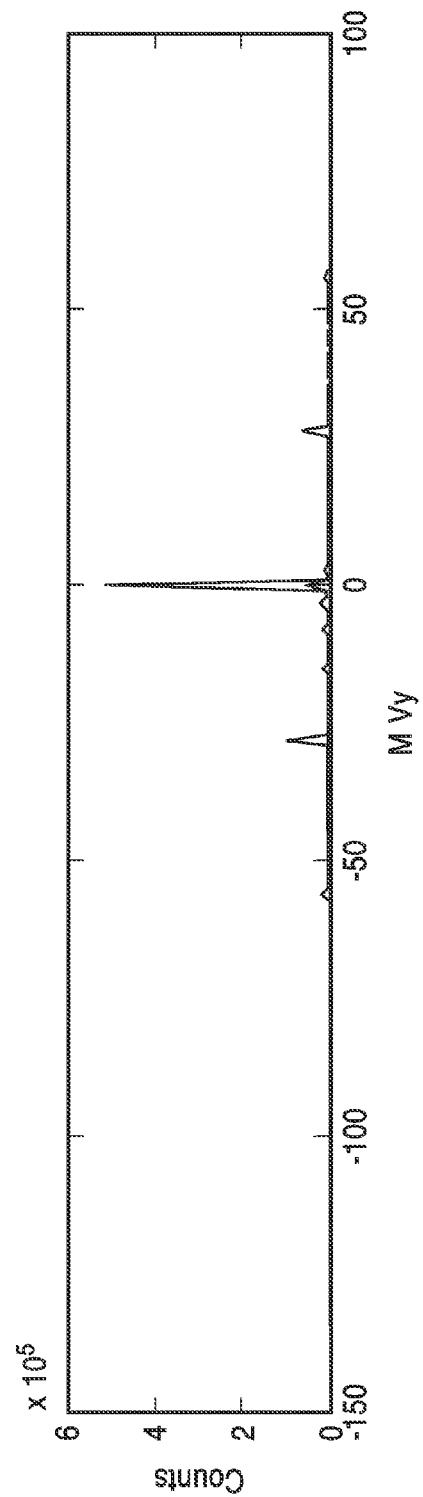

FIG. 5A through FIG. 5C depict how the MVD coding scheme has a symmetric distribution and demonstrates a shifted peak at MVx and not at MVy to the negative region based on RExt4.1. In FIG. 5A the percentage of Intra and IBC are seen in relation to coding unit size, showing examples at 8, 16 32 and 64. In FIG. 5B MVx is shown with a shifted peak to the left of zero, shown circled. In FIG. 5C MVy is shown with its peak at zero.

Pseudo-code changes for making this intra-block copying prediction mode are now described. The inputs of the process are the following:

(a) A sample location (xTbCmp, yTbCmp) specifies the top-left sample of the current transform block relative to the top left sample of the current picture.

(b) A variable nTbS specifies the transform block size.

(c) A variable bvIntra specifies the block copying vector.

(d) A variable cIdx specifies the color component of the current block.

Output from this process are predicted samples predSamples[x][y], with x, y=0, . . . nTbS−1.

The variable by represents the block vector for prediction in full-sample units, which may be derived as follows:

$$bv[0]=(bv\text{Intra}[0]-nTbs)>>(((cIdx==0)?1:\text{Sub-} \\ \text{Width}C)-1) \quad (8\text{-}63)$$

$$bv[1]=bv\text{Intra}[1]>>(((cIdx==0)?1:\text{SubHeight}C)-1) \quad (8\text{-}64)$$

The (nTbS)×(nTbS) array of predicted samples, with x, y=0, . . . nTbS−1, are derived as follows:

First, the reference sample location (xRefCmp, yRefCmp) is specified by:

$$(xRefCmp,yRefCmp)=(xTbCmp+x+bv[0],yTbCmp+y+ \\ bv[1]) \quad (8\text{-}65)$$

Each sample at the location (xRefCmp, yRefCmp) is assigned to predSamples[x][y].

3.0 Improving Intra-Block Copying Mode in a CTU.

This section describes a default block vector predictor for intra-block copying in RExt (i.e., based on Rext5.0.1), which improves the coding efficiency of Bv. In range extension (RExt) of HEVC, intra-block copying was used as additional intra coding mode. The block vector is coded predicatively.

Figure 6:
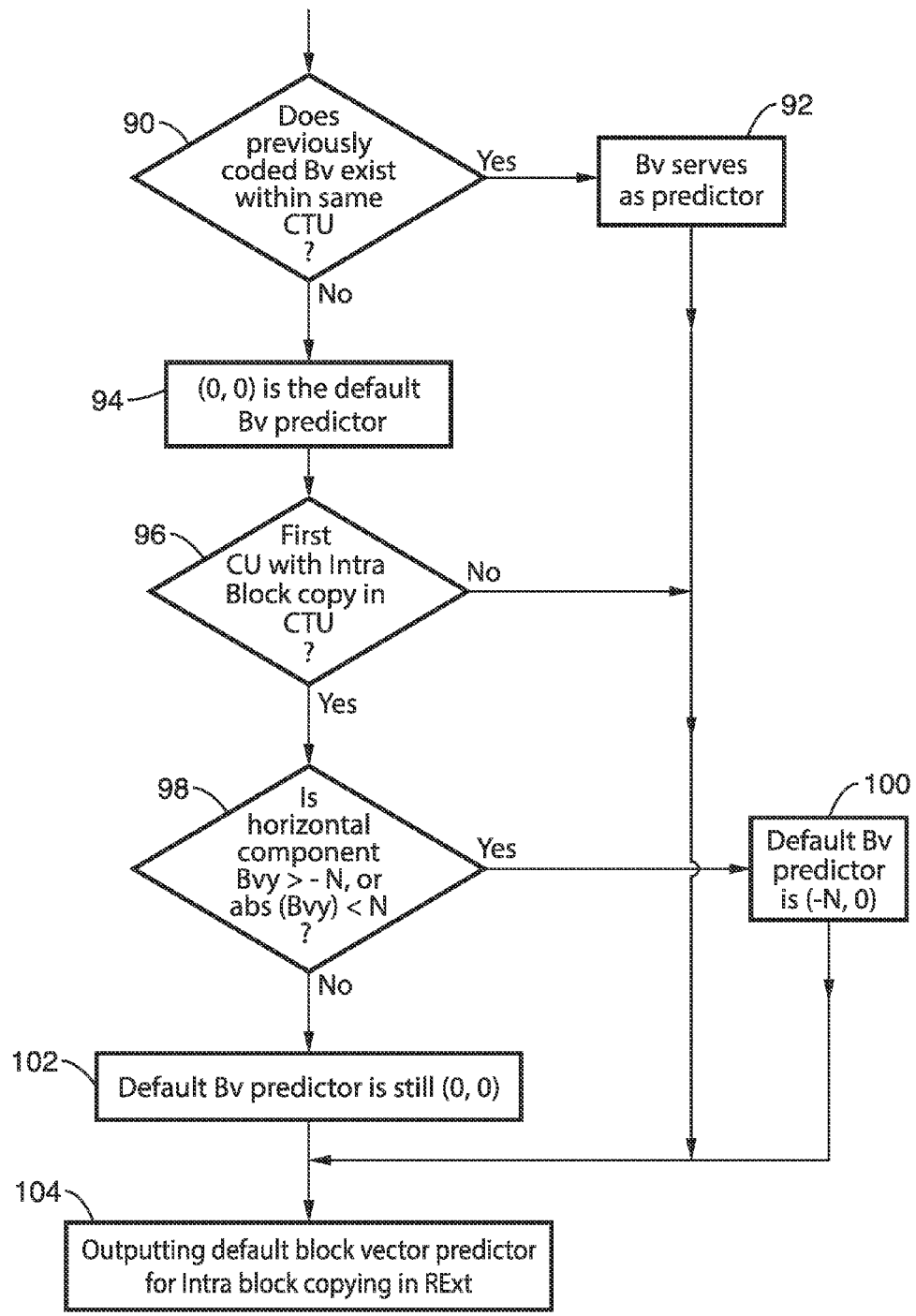
FIG. 6 is a flow diagram of determining a default block vector predictor for intra-block copying in RExt toward improving coding efficiency of By according to an embodiment of the technology presented.

FIG. 6 illustrates this default block vector predictor for intra-block copying. When a previously coded Bv within the same coding tree unit (CTU) exists 90, the Bv serves as the predictor 92; otherwise (the first CU with intra BC mode), (0, 0) is the default By predictor 94.

When (0, 0) is the predictor, it is actually coding By directly. By coding efficiency can be further improved by exploring the redundancy.

The presented technology provides solutions to improve block vector coding for the first CU with intra-block copying mode in a CTU 96.

For the first CU with intra-block copying mode in a CTU, a check is made (a determination) 98 if a directional component (e.g., horizontal) block vector Bvy>−N, or abs (Bvy)<N, where N is the width of CU; if true, then default By predictor is (−N, 0) 100; otherwise, the default By predictor is still (0, 0) 102. A default block vector predictor for intra-block copying in RExt is output 104. Similar processes are also described in the following implementations.

4.0 Implementation 1 for Improving Intra-Block Copying Mode.

The block vector bvIntra is derived by the following ordered steps, for the variable compIdx proceeding over the values 0, . . . 1:

(1) First, depending upon the number of times this process has been invoked for the current coding tree unit, the following applies:

(1)(a) If this process is invoked for the first time for the current coding tree unit, then bvIntra[compIdx] is derived as follows:

$$bv\text{Intra}[compIdx]=Bvd\text{Intra}[xCb][yCb][compIdx] \quad (8\text{-}25a)$$

if bvIntra[1] is greater than −nCbS
bvIntra[0]=bvIntra[0]−nCbS, wherein the above two lines describe a change to the text of JCTVC-O1005_v3.doc.

(1)(b) Otherwise, bvIntra[compIdx] is derived as follows:

$$bv\text{Intra}[compIdx]=Bvd\text{Intra}[xCb][yCb][compIdx]+ \\ Bvp\text{Intra}[compIdx] \quad (8\text{-}25b)$$

(2) Secondly, the value of BvpIntra[compIdx] is updated to be equal to bvIntra[compIdx].

4.1 Implementation 2 for Improving Intra-Block Copying Mode.

The block vector bvIntra is derived by the following ordered steps, for the variable compIdx proceeding over the values from 0, . . . 1:

(1) Depending upon the number of times this process has been invoked for the current coding tree unit, the following applies:

(1)(a) If this process is invoked for the first time for the current coding tree unit, bvIntra[compIdx] is derived as follows:

$$bv\text{Intra}[compIdx]=Bvd\text{Intra}[xCb][yCb][compIdx] \quad (8\text{-}25c)$$

if abs(bvIntra[1]) is smaller than nCbS
bvIntra[0]=bvIntra[0]−nCbS wherein the above two lines describe a change to the text of JCTVC-O1005_v3.doc.

(1)(b) Otherwise, bvIntra[compIdx] is derived as follows:

$$bv\text{Intra}[compIdx]=Bvd\text{Intra}[xCb][yCb][compIdx]+ Bvp\text{Intra}[compIdx] \quad (8\text{-}25d)$$

(2) The value of BvpIntra[compIdx] is updated to be equal to bvIntra[compIdx].

The enhancements described in the presented technology can be readily implemented within various image and video encoders and decoders. It should also be appreciated that encoders and decoders are preferably implemented to include one or more computer processor devices (e.g., CPU, microprocessor, microcontroller, computer enabled ASIC, etc.) and associated memory (e.g., RAM, DRAM, NVRAM, FLASH, computer readable media, etc.) whereby programming stored in the memory and executable on the processor perform the steps of the various process methods described herein. The computer and memory devices were not depicted in the flowcharts and other diagrams for the sake of simplicity of illustration, as one of ordinary skill in the art recognizes the use of computer devices for carrying out steps involved with image/video encoding and decoding. The presented technology is non-limiting with regard to memory and computer-readable media, insofar as these are non-transitory, and thus not constituting a transitory electronic signal.

Embodiments of the present technology may be described with reference to flowchart illustrations of methods and systems according to embodiments of the technology, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula (e), or computational depiction(s).

From the description herein, it will be appreciated that that the present disclosure encompasses multiple embodiments which include, but are not limited to, the following:

1. An apparatus for eliminating data redundancy in motion vector coding, comprising: (a) an entropy encoder configured for performing motion vector (MV) coding; (b) a computer processor of said entropy encoder; and (c) programming in a non-transitory computer readable medium, executable on said computer processor, for performing steps including: (c)(i) preventing intra-block copying operations of a block whose motion vector overlaps the block itself or includes any non-reconstructed pixels; (c)(ii) wherein said block whose motion vector overlaps the block itself is within a current coding unit (CU) having a height H and width W; and (c)(iii) restricting allowable intra-block copying operations of a block from the current coding unit (CU) to a region outside of a pixel area that is twice the height (2H) and twice the width (2W) of the current coding unit; and (c)(iv) eliminating redundancy by not coding the number of bits associated with the height (H) and/or width (W) of the block which is subject to inter-block copying.

2. The apparatus of any preceding embodiment: wherein said programming executable on said computer processor is configured to perform said restricting allowable intra-block copying operations by adding a motion vector offset to the horizontal motion vector component (MVx) during encoding, and subtracting the motion vector offset from the horizontal motion vector component (MVx) during decoding, if the absolute value of the horizontal motion vector is less than the width of the coding unit; and wherein redundancy is eliminated by coding MVx and MVy to an extent that they exceed the width (W), and height (H), respectively, of the block subject to intra-block copying.

3. The apparatus of any preceding embodiment, wherein said motion vector offset is selected from the group of offsets consisting of a value equivalent to the height of the coding unit, and a predetermined value.

4. The apparatus of any preceding embodiment, wherein said predetermined value comprises an integer or binary value.

5. The apparatus of any preceding embodiment, wherein said programming executable on said computer processor is configured to perform said restricting allowable intra-block copying operations by adding a motion vector offset to the vertical motion vector component (MVy) during encoding, and subtracting the motion vector offset from the vertical motion vector component (MVy) during decoding, if the absolute value of the horizontal motion vector is less than the height of the coding unit; and wherein redundancy is eliminated by coding MVx and MVy to an extent that they exceed the width (W), and height (H), respectively, of the block subject to intra-block copying.

6. The apparatus of any preceding embodiment, wherein said motion vector offset is selected from the group of offsets consisting of a value equivalent to the width of the coding unit, and a predetermined value.

7. The apparatus of any preceding embodiment, wherein said predetermined value comprises an integer or binary value.

8. The apparatus of any preceding embodiment, wherein said programming executable on said computer processor is configured to perform said restricting allowable intra-block copying operations by adding a motion vector offset to the horizontal motion vector component (MVx), or vertical motion vector component (MVy), or to both the horizontal and vertical motion vector components (MVx and MVy) during encoding, and subtracting those horizontal and/or vertical motion vector offsets during decoding; and wherein redundancy is eliminated by coding MVx and MVy to an extent that they exceed the width (W), and height (H), respectively, of the block subject to intra-block copying.

9. The apparatus of any preceding embodiment, wherein said motion vector offset is selected from a group of offsets consisting of a value equivalent to the width (W) of the coding unit, the height (H) of the coding unit, and a predetermined value.

10. The apparatus of any preceding embodiment, further comprising programming executable on said computer processor configured for performing high-level syntax for encoding a solution selection in a sequence parameter set (SPS).

11. The apparatus of any preceding embodiment, further comprising programming executable on said computer processor configured for performing high-level syntax for encoding a solution selection in a picture parameter set (PPS).

12. The apparatus of any preceding embodiment, further comprising programming executable on said computer processor configured for performing high-level syntax for encoding a solution selection in a slice header.

13. The apparatus of any preceding embodiment, further comprising programming executable on said computer processor configured for assuming a symmetric distribution of syntax elements in providing redundancy in motion vector coding.

14. An apparatus for performing motion vector coding during image/video encoding, comprising: (a) an entropy encoder configured for performing motion vector (MV) coding; (b) a computer processor of said entropy encoder; and (c) programming in a non-transitory computer readable medium, executable on said computer processor, for performing steps including: (c)(i) preventing intra-block copying operations of a block which overlaps itself or includes any non-reconstructed pixels; (c)(ii) wherein said block to be copied is within a current coding unit (CU) having a height H and width W; and (c)(iii) restricting allowable intra-block copying operations of a block from the current coding unit (CU) to a region outside of a pixel area that is twice the height (2H) and twice the width (2W) of the current coding unit; and (c)(iv) said restricting of allowable intra-block copying operations is performed in response to adding a motion vector offset to a motion vector component during encoding, and subtracting the same motion vector offset from the motion vector component during decoding.

15. The apparatus of any preceding embodiment, wherein said motion vector offset is only added and subtracted from a motion vector component if an absolute value of that motion vector is less than a pixel span of the coding unit along the axis of that motion vector component.

16. The apparatus of any preceding embodiment, wherein said motion vector offset is selected from the group of offsets consisting of a value equivalent to the pixel span of the coding unit in a horizontal axis, a value equivalent to the pixel span of the coding unit in a vertical axis, and a predetermined value.

17. The apparatus of any preceding embodiment, wherein said predetermined value comprises an integer or binary value.

18. An apparatus for providing a default block vector predictor for intra-block copying, comprising: (a) an entropy coder configured for performing intra-block copying in range extension (RExt); (b) a computer processor of said entropy coder; and (c) programming in a non-transitory computer readable medium, executable on said computer processor, for performing steps including: (c)(i) selecting a block vector (Bv) as a predictor when a previously coded Bv within a same coding tree unit (CTU) exists; (c)(ii) determining, for a first coding unit (CU) with intra-block copying within a CTU, that a directional component is either greater than an inverse of coding unit (CU) width, or its absolute value is less than the coding unit (CU) width; (c)(ii)(A) setting default predictor for that directional component to an inverse of the coding unit width if condition (i) is met; (c)(ii)(B) setting default predictor to zero for that directional component if condition (i) is not met; and (c)(iii) outputting default block vector predictor for intra-block copying in RExt.

19. The apparatus of any preceding embodiment, wherein said directional component comprises a horizontal component of the block vector.

20. The apparatus of any preceding embodiment, wherein said apparatus comprises an HEVC coding system configured for performing in range extensions (RExt).

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for encoding at least one of an image or a video, comprising:
an entropy encoder configured to:
code a motion vector;
prevent intra-block copying operations of a first block, wherein the first block overlaps with itself or includes non-reconstructed pixels,
wherein the first block, that overlaps with itself, is within a coding unit, and
wherein the coding unit has a height and a width; and
restrict allowable intra-block copying operations of a second block from the coding unit to a region outside of a pixel area that is twice the height and twice the width of the coding unit,
wherein the restriction of the allowable intra-block copying operations is based on each of an addition of a motion vector offset to a motion vector component during encoding, and a subtraction of the motion vector offset from the motion vector component during decoding,
wherein each of the addition of the motion vector offset to the motion vector component and the subtraction of the motion vector offset to the motion vector component is based on an absolute value of the motion vector that is less than a pixel span of the coding unit along an axis of the motion vector component.

2. The apparatus recited in claim 1, wherein the motion vector offset is selected from a group of offsets consisting of a first value equivalent to the pixel span of the coding unit in a horizontal axis, a second value equivalent to the pixel span of the coding unit in a vertical axis, and a third value.

3. The apparatus recited in claim 2, wherein the third value comprises at least one of an integer or a binary value.

4. The apparatus recited in claim 1, wherein the entropy encoder is further configured to encode, based on a high-level syntax, a solution selection in a sequence parameter set.

5. The apparatus recited in claim 1, wherein the entropy encoder is further configured to encode, based on a high-level syntax, a solution selection in a picture parameter set.

6. The apparatus recited in claim 1, wherein the entropy encoder is further configured to encode, based on a high-level syntax, a solution selection in a slice header.

7. The apparatus recited in claim 1, wherein the entropy encoder is further configured to code the motion vector based on a symmetric distribution of syntax elements.

8. A method for encoding at least one of an image or a video, comprising:
coding a motion vector;
preventing intra-block copying operations of a first block, wherein the first block overlaps with itself or includes non-reconstructed pixels,
wherein the first block, that overlaps with itself, is within a coding unit, and
wherein the coding unit has a height and a width; and
restricting allowable intra-block copying operations of a second block from the coding unit to a region outside of a pixel area that is twice the height and twice the width of the coding unit,
wherein the restriction of the allowable intra-block copying operations is based on each of an addition of a motion vector offset to a motion vector component during encoding, and a subtraction of the motion vector offset from the motion vector component during decoding, and
wherein each of the addition of the motion vector offset to the motion vector component and the subtraction of the motion vector offset to the motion vector component is based on an absolute value of the motion vector that is less than a pixel span of the coding unit along an axis of the motion vector component.

9. The method recited in claim 8, wherein the motion vector offset is selected from a group of offsets consisting of a first value equivalent to the pixel span of the coding unit in a horizontal axis, a second value equivalent to the pixel span of the coding unit in a vertical axis, and a third value.

10. The method recited in claim 9, wherein the third value comprises at least one of an integer or a binary value.

11. The method recited in claim 8, further comprising coding, based on a high-level syntax, a solution selection in a sequence parameter set.

12. The method recited in claim 8, further comprising coding, based on a high-level syntax, a solution selection in a picture parameter set.

13. The method recited in claim 8, further comprising coding, based on a high-level syntax, a solution selection in a slice header.

14. The method recited in claim 8, further comprising coding the motion vector based on a symmetric distribution of syntax elements.

15. A non-transitory computer-readable medium having stored thereon computer-executable instructions that, when executed by a processor, cause a computer to perform operations, the operations comprising:
coding a motion vector;
preventing intra-block copying operations of a first block, wherein the first block overlaps with itself or includes non-reconstructed pixels,
wherein the first block, that overlaps with itself, is within a coding unit, and
wherein the coding unit has a height and a width; and
restricting allowable intra-block copying operations of a second block from the coding unit to a region outside of a pixel area that is twice the height and twice the width of the coding unit,
wherein the restriction of the allowable intra-block copying operations is based on each of an addition of a motion vector offset to a motion vector component during encoding, and a subtraction of the motion vector offset from the motion vector component during decoding, and
wherein each of the addition of the motion vector offset to the motion vector component and the subtraction of the motion vector offset to the motion vector component is based on an absolute value of the motion vector that is less than a pixel span of the coding unit along an axis of the motion vector component.

* * * * *